Feb. 27, 1923. Re. 15,551

J. OLIPHANT

COMPRESSOR CONTROLLING MECHANISM

Original Filed Oct. 20, 1916 2 sheets-sheet 1

Inventor:
John Oliphant.
by Oscar L. Kohl
Atty.

Feb. 27, 1923. Re. 15,551

J. OLIPHANT

COMPRESSOR CONTROLLING MECHANISM

Original Filed Oct. 20, 1916 2 sheets-sheet 2

Inventor:
John Oliphant.
by Herbert L. Roth
Atty.

Reissued Feb. 27, 1923. Re. 15,551

UNITED STATES PATENT OFFICE.

JOHN OLIPHANT, OF CHICAGO, ILLINOIS, ASSIGNOR TO SULLIVAN MACHINERY COMPANY, A CORPORATION OF MASSACHUSETTS.

COMPRESSOR-CONTROLLING MECHANISM.

Original No. 1,375,656, dated April 19, 1921, Serial No. 126,793, filed October 20, 1916. Renewed August 13, 1920, Serial No. 403,299. Application for reissue filed December 20, 1922. Serial No. 608,066.

*To all whom it may concern:*

Be it known that I, JOHN OLIPHANT, a citizen of the United States, residing at Chicago, in the county of Cook and State of Illinois, have invented certain new and useful Improvements in Compressor-Controlling Mechanisms, of which the following is a full, clear, and exact specification.

My invention relates to compressor controlling mechanism.

It has for its object to provide improved means for controlling the loading and unloading of a compressor. Another object of my invention is to provide an improved fluid operated pumping system for material in fluid form wherein the pumping fluid is supplied by a compressor and the operation of the system is controlled by means whereby the material pumped controls the loading and unloading of said compressor. A further object of my invention is to provide improved means whereby a compressor used in connection with an air-lift or other system of pumping material in fluid form may be automatically unloaded or loaded to maintain a constant level of the fluid pumped. A still further object of my invention is to provide an improved controlling mechanism for compressors whereby a plurality of the same may be controlled and used in such a manner that they will be automatically unloaded in sequence, as, for instance, when the material pumped reaches predetermined levels, or automatically loaded in sequence, as, for instance, when the same falls below predetermined levels. These and other objects of my invention will hereinafter appear.

In the accompanying drawings I have, for purposes of illustration, shown two embodiments which my invention may assume in practice, illustrating the same as applied to an air-lift system for pumping liquid.

In these drawings:—

Figures 1, 2:
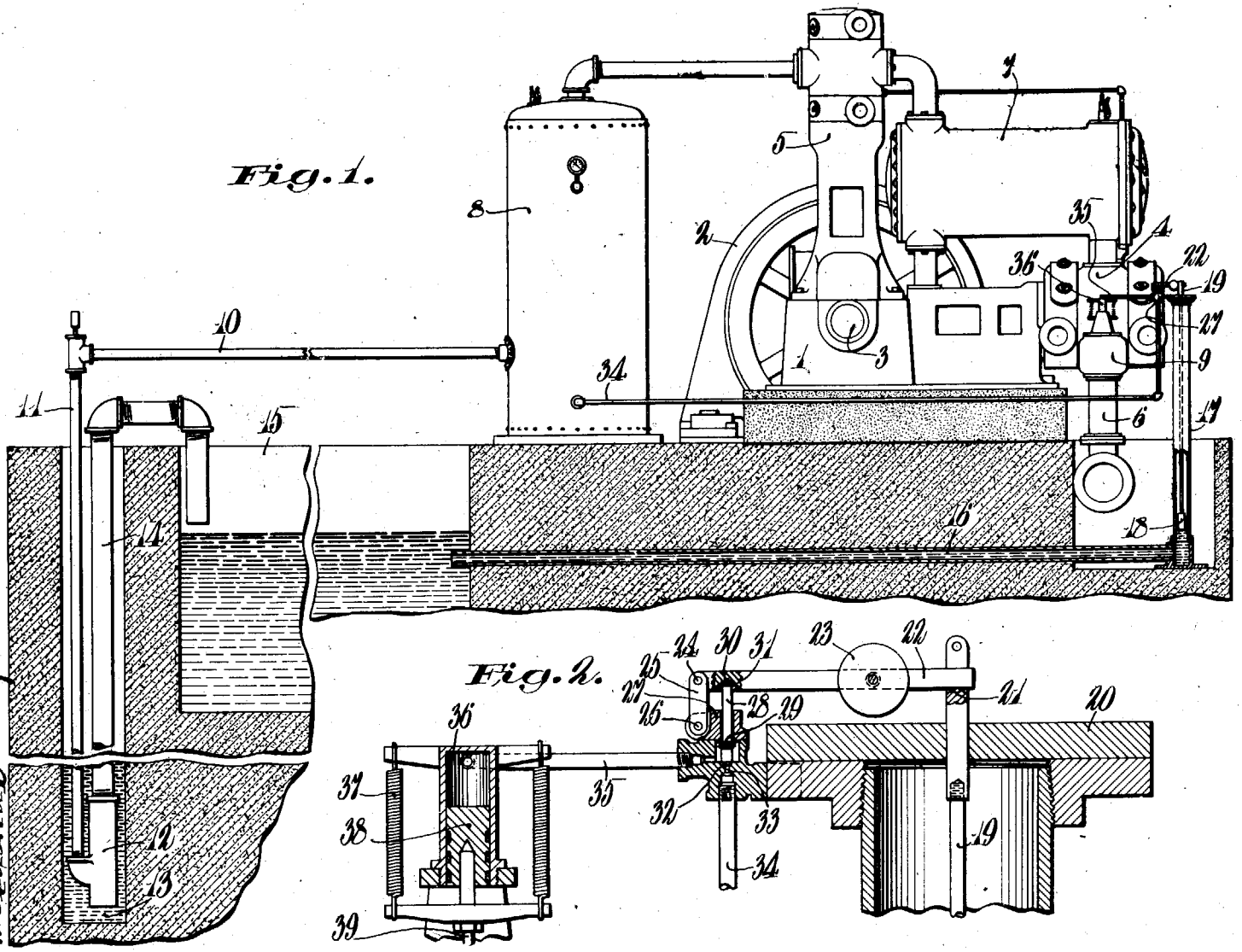
Figure 1 is a side elevation, partially in section, of a single unit constructed in accordance with my invention.
Fig. 2 is a detail sectional view of the unloader controlling valve thereof.

In the illustrative construction shown in Fig. 1, it will be noted that a compressor 1 is shown, the same being driven by any suitable source of power, as, for instance, a motor 2, connected to the compressor shaft 3. In this instance, the compressor is also illustrated as of the angle compound type, having a horizontal low pressure cylinder 4 and a vertical high pressure cylinder 5. This compressor receives air from a suitable inlet 6 and delivers the same from its low pressure cylinder 4 to an inter-cooler 7 which communicates with the high pressure cylinder 5 in a well-known manner, the latter in turn delivering the air to a receiver 8. As shown, an unloader valve 9, which may be of any well-known construction, is also provided in the inlet so that when desired the compressor may be unloaded or loaded by operation thereof.

In my improved construction, the pressure fluid in the receiver 8 is conducted through a pipe 10 to a down delivery pipe 11 of an air-lift pump, the pipe in turn discharging into a foot piece 12 of that pump in such a manner as to force the liquid in the well 13 up through a pipe 14 and into a reservoir 15. From this reservoir 15 the liquid is conducted through a pipe 16 to a riser 17 preferably located adjacent the compressor and having a float 18 therein, which float is, of course, thus responsive to the variations in fluid level in the reservoir 15. As shown, this float 18 is also provided with an upstanding rod 19 which is movable through a cover 20 of the riser, and is provided upon its upper end with a knife edge 21 engageable with the free end of a lever 22. This lever, as shown, preferably carries a weight 23 and is pivoted at its opposite end at 24 on the upper end of a short upstanding link 25 which is in turn pivoted at its lower end at 26 to a suitable support 27 which may, if desired, form a part of the riser cover. Controlled by this lever 22 and movable in a suitable chamber in the support 27 is a reciprocable valve member 28 having an annular flange 29 intermediate its ends and one end 30 adapted to seat in a recess 31 near the pivot 24 of the lever 22 and its other end 32 adapted to seat in and close a lower port 33 communicating through a pipe 34 with the receiver 8. The flange 29 is adapted when raised to close an escape vent along the stem 28. As shown, a pipe 35 is also connected between the chamber of the valve 28 and the unloader valve cylinder 36 in such a manner that, when the valve 28 is raised by the receiver pressure, the latter may act in opposition to the usual unloader valve springs 37 and depress the piston 38 and the unloader valve stem 39 connected thereto, to close the unloader valve.

In the operation of the construction shown in Fig. 1, it will be obvious that when the compressor, through the medium of the air-lift mechanism, has caused the liquid to rise to a predetermined height in the reservoir 15, the float 18 in the riser 17 will be raised in such a manner as to lift the rod 19 thereof and lift the lever 22 about its pivot. This will release the valve 28 so that the receiver pressure, acting through the pipe 34, will be sufficient to lift that valve from its seat over the mouth of the port 33 and thereby open communication between the receiver and the piston chamber 36 in such a manner as to cause the unloader valve 9 to be closed and the compressor to be unloaded. It will also be obvious that, conversely, when the level of the liquid in the reservoir 15 falls below a predetermined amount, the float 18 will drop and thereby operate the lever 22 and valve 28 to close the communication between the receiver 8 and the unloading valve piston chamber 36 above described, whereupon through the action of the springs 37 the unloader valve will be opened and the compressor again loaded the air above the piston 38 escaping past the stem 28. It will thus be seen that I have provided an improved pumping system of the type utilizing a fluid as a pumping medium wherein the level of the material pumped in a reservoir associated with the system controls the unloading and reloading of a compressor which supplies the pumping fluid.

Figure 3:
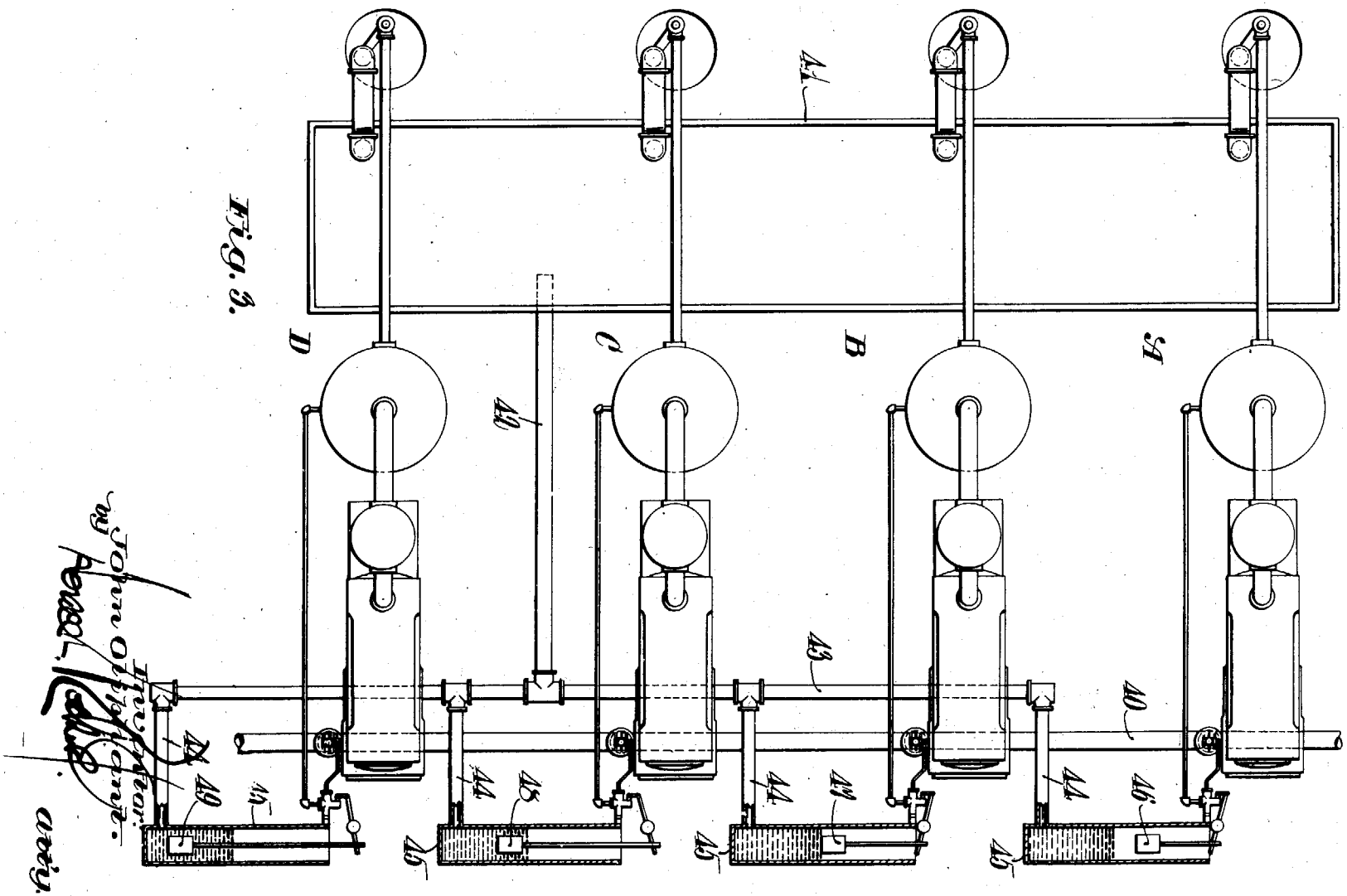
Fig. 3 is a diagrammatic view of a plurality of units such as shown in Fig. 1, connected together in the form of a system, the compressor driving element or elements being omitted to facilitate illustration.

In the construction shown in Fig. 3 it will be noted that a plurality of units of the construction shown in Fig. 1 are illustrated in tandem, the same being indicated at A, B, C, and D and preferably being connected to the same intake main 40. In this system, it will also be noted that a single reservoir 41 may be used, though this is not imperative, the system being adapted to use with separate reservoirs when desired. As shown herein, a single reservoir tap or pipe 42 may also be connected with a single longitudinally disposed pipe or main 43 which is in turn connected to the several units through a series of branch pipes 44 with a series of risers 45. In these risers are carried floats 46, 47, 48 and 49 which are connected to the unloader valves through mechanism of the same construction as that hereinabove described in detail in connection with the construction shown in Fig. 1 so that it is unnecessary here to repeat the description thereof. However, it will be noted that in this construction these floats 46, 47, 48 and 49 are arranged at diierent levels so that, as the fluid level rises in the reservoir 41, these floats are raised in sequence in such a manner as to unload their compressors progressively as the reservoir is filled or to load the same as the reservoir is emptied.

It will be noted that in my improved construction all attention on the part of the operator is unnecessary, the compressor being unloaded or loaded as the liquid level in the reservoir varies, in such a manner as to keep any desired level of liquid available and at the same time keep down the power requirements. It will also be noted that the same automatic action is obtained when a plurality of compressors is used, the mechanism then operating progressively to cut in or out the several compressors in a definite sequence as the liquid level varies. These and other advantages of my improved construction will, however, be clearly apparent to those skilled in the art.

This is a reissue application based on Letters Patent No. 1,375,656, granted April 19, 1921.

While I have in this application specifically described two embodiments which my invention may assume in practice, it will of course be understood that these forms of the same may be extensively modified without in any manner departing from the spirit of the invention, it being my intention to include all such modifications within the scope of the appended claims.

What I claim as new and desire to secure by Letters Patent is:

1. In an unloading apparatus, the combination comprising a compressor, a pump connected therewith, a reservoir receiving material from said pump, and means controlled by the level of the material in said reservoir for unloading said compressor.

2. In a loading apparatus, the combination comprising a compressor, a pump connected therewith, a reservoir receiving material from said pump, and means controlled by the level of the material in said reservoir for loading said compressor.

3. In an unloading apparatus, the combination comprising a compressor, a pump connected therewith, a reservoir receiving material from said pump, and means responsive to variations in level of the material in said reservoir for successively loading and unloading said compressor.

4. In an unloading apparatus, the combination comprising a compressor, a pump connected therewith, an unloading valve controlling said compressor, a reservoir receiving the material delivered by said pump, and means responsive to variations in level of the material in said reservoir controlling said unloading valve.

5. In combination, a compressor, a pump connected therewith, a reservoir receiving the material delivered by said pump, an unloader valve for said compressor, means for operating said unloader valve, and means responsive to variations in level of the material in said reservoir controlling said last mentioned means.

6. In combination, a compressor, a receiver connected therewith, a pump connected to said receiver, a reservoir into which said pump delivers, a compressor unloader valve controllable by receiver pressure, and controlling means therefor responsive to variations in level of the material in said reservoir.

7. In combination, a compressor, a receiver connected therewith, a pump connected to said receiver, a reservoir receiving the material pumped, a riser connected with said reservoir, a float in said riser, an unloader valve for said compressor, and means controlled by said float controlling said unloader valve.

8. In combination, a compressor, a pump connected therewith, a reservoir receiving the material delivered by said pump, a riser connected with said reservoir, an unloader valve for said compressor, and means responsive to the variations in level of the liquid in said riser controlling said unloader valve.

9. In combination, a compressor, a pump connected therewith, a reservoir receiving the material delivered by said pump, a float carried in said riser, an unloader valve for said compressor, means controlling said unloader valve, and operative connections between said float and said controlling means.

10. In a fluid pumping system, the combination comprising a plurality of compressors, pumping mechanism connected therewith, means for receiving the fluid pumped by said mechanism, and means controlled by the level of the fluid in said receiving means for unloading said compressors.

11. In a fluid pumping system, the combination comprising a plurality of compressors, pumping mechanism connected therewith, means for receiving the material pumped by said mechanism, and means controlled by the level of the fluid in said receiving means for progressively unloading said compressors.

12. In a fluid pumping system, the combination comprising a plurality of compressors, pumping mechanism connected therewith, means for receiving the material pumped by said mechanism, and means controlled by the level of the fluid in said receiving means for progressively unloading said compressors and subsequently loading the same.

13. In a fluid pumping system, the combination comprising a plurality of compressors, pumping mechanism connected therewith, means for receiving the material pumped by said mechanism, and means controlled by the level of the fluid in said receiving means for progressively unloading said compressors and subsequently loading the same in inverse order.

14. In a fluid pumping system, the combination comprising a plurality of compressors, pumping mechanism connected therewith, means for receiving the material pumped, a plurality of risers connected to said receiving means, unloading mechanism for said compressors, and means carried in said risers and responsive to different variations in level of the material in said receiving means for controlling said unloading mechanism.

15. In a fluid pumping system, the combination comprising a plurality of compressors, a plurality of pumps connected therewith, a reservoir receiving the material pumped, a single tap communicating with said reservoir, a single main communicating with said tap, a plurality of risers connected with said main, unloader valves for said compressors, and means controlled by the variation in level of the fluid in said risers for operating said unloader valves.

16. In a fluid pumping system, the combination comprising a plurality of compressors, a plurality of pumps connected therewith, a reservoir receiving the material pumped, a single tap communicating with said reservoir, a single main communicating with said tap, a plurality of risers connected with said main, unloading valves for said compressors, and means controlled by the variation in level of the fluid in said risers for operating said unloader valves in sequence.

17. In a fluid pumping system, the combination comprising a plurality of compressors, a plurality of pumps connected therewith, a reservoir receiving the material pumped, a single tap communicating with said reservoir, a single main communicating with said tap, a plurality of risers connected with said main, unloader valves for said compressors, and means controlled by the variation in level of the fluid in said risers for successively actuating said valves to load or unload said compressors.

18. In a pumping system, in combination, a compressor, a receiver connected therewith, pumping mechanism connected with said receiver and operated by fluid pressure therefrom, a reservoir receiving material delivered by said pump, and means controlled by the level of the material in said reservoir for loading and unloading said compressor.

19. In a pumping system, in combination, a compressor, a receiver connected therewith, pumping mechanism connected with said receiver and operated by fluid pressure therefrom, said pumping mechanism drawing material from a source independent of said receiver, a reservoir separate from said receiver and receiving material delivered by said pump, and means controlled by the level of the material in said reservoir for loading and unloading said compressor.

20. In a fluid pumping system, in combination, a plurality of compressors, one or more receivers connected therewith, pumping mechanism operated by fluid pressure from said receivers, means for receiving the fluid delivered by said mechanism, and means controlled by the level of the fluid in said last named receiving means for loading and unloading said compressors.

21. In a pumping system, a source of fluid pressure, a plurality of pumping units, a reservoir for receiving the material from said units, and means operative at different levels of the material in said reservoir for successively controlling the flow of fluid from said source to said units.

22. In a pumping system, a source of fluid pressure, a plurality of pumping units, a reservoir for receiving the material from said units, and means operative at different stages of filling of said reservoir for controlling the flow of fluid from said source to said units in such a manner that all the units are operated at the lowest stage and a part of the units at the highest stage.

23. In a pumping system, a plurality of air lift pumping means, a reservoir to receive the material from said pumping means, and means successively controlled by the level of material in said reservoir for controlling the flow of operating fluid to said pumping means to operate the latter.

24. In a pumping system, a plurality of pumping means, a reservoir to receive the material from said pumping means, and automatically operating means controlled by the level of material in said reservoir for causing said pumping means to be thrown into operation successively and to be stopped successively.

25. In an unloading apparatus, the combination comprising a compressor, a pump connected therewith and operated by fluid from said compressor, a reservoir relative to which said pump transfers material, means operative to load or unload said compressor, and means controlled by the level of the material in said reservoir for controlling the operation of said first mentioned means.

26. In a pumping system, the combination with a pumping mechanism for moving liquid by the action of a fluid pumping medium, a compressor for supplying such fluid pumping medium, and loading and unloading mechanism operative in different positions respectively to cause said compressor to supply said fluid pumping medium and to interrupt the pumping of said medium thereby, of means controlled by the liquid and controlling said loading and unloading mechanism and causing movements thereof to its said different positions.

27. In combination, a pumping system for material in fluid form comprising an air lift pump, a compressor, fluid supply connections between said compressor and said air lift pump whereby said compressor supplies the pump with a pumping medium, unloading means for said compressor, and controlling means for said unloading means operative to effect control thereof in accordance with variations in the level of said material at a point within said system.

28. In a pumping system, a plurality of pumping means each including a compressor and liquid pumping means operated by fluid from said compressor, reservoir means relative to which said pumping means are arranged to transfer liquid, and separate compressor loading and unloading means controlled by the level of liquid in said reservoir means each respectively controlling the flow of operating fluid to one of said pumping means to operate the latter.

In testimony whereof I affix my signature.

JOHN OLIPHANT.